United States Patent Office 3,367,892
Patented Feb. 6, 1968

3,367,892
POLYMERIC SOIL-STABILIZING COMPOSITIONS AND METHOD OF USING THE SAME
Joseph S. Jorczak, Washington Crossing, and Harold L. Elkin, Levittown, Pa., assignors to Thiokol Chemical Corporation, Bristol, Pa., a corporation of Delaware
No Drawing. Continuation-in-part of application Ser. No. 288,888, June 19, 1963. This application Sept. 28, 1966, Ser. No. 582,504
5 Claims. (Cl. 260—2.5)

ABSTRACT OF THE DISCLOSURE

A method and composition for application to soil or sand whereby said soil or sand is stabilized to permit supporting heavy loads thereon such as is created by military vehicles and the like. Included in the inventive concept is a resinous polyurethane composition which has added thereto a curing agent for subsequent hardening in the subsurface interstices of the soil or sand, a foaming agent and a foaming depressant or delay solvent which strengths by immobilizing the soil or sand particles thereof giving them cohesion. By this means the load bearing qualities are much improved and savings in materials applied are achieved.

---

This invention relates to the application of foaming polyurethane resins to soil and sands to increase the load-bearing capacity thereof.

This application is a continuation-in-part of U.S. Patent Application Serial No. 288,888, filed on June 19, 1963, by Joseph S. Jorczak and Harold L. Elkin, now abandoned.

Heretofore liquid polymeric materials have been applied to soil and sands and allowed to harden after permeating into the interstices thereof, thereby providing a surface capable of supporting relatively high loads. It has previously been the practice to apply sufficient polymeric material to fill the interstices within the soil or sand which is to be stabilized, which technique requires a large amount of the polymeric material for a given area of ground. However, in accordance with the invention a foaming agent is incorporated in polyurethane soil-stabilizing compositions, together with a substance that will delay the action of said foaming agent, thereby providing for foaming of said soil-stabilizing compositions after they have been applied to, and permeated into, a soil or sand that is to be hardened. The foaming of the inventive soil-stabilizing compositions within the interstices of soil or sands reduces the amount of polymeric material that must be employed to harden a particular type of ground to a given extent, as a thin continuous film of the soil-stabilizing compositions is spread upon the surfaces of soil or sand particles surrounding the interstices into which the soil-stabilizing compositions are percolated. Thus cohesion of soil or sands treated with soil-stabilizing compositions in accordance with the invention is attained without completely filling the interstices and said soil or sands with a hardenable polymeric material.

It is accordingly an object of this invention to provide a less expensive method of stabilizing soil or sands by applying a hardenable polymeric material thereto.

Another object of the invention is to stabilize soil or sands with minimal amounts of hardenable polymeric compositions.

Still another object of the invention is to provide soil-polymer compositions of high strength at relative low ratios of polymer to soil.

Another object of the invention is to stabilize soil or sand so that dust will not be raised from the surface thereof during military operations such as helicopter landings and takeoffs.

The aforesaid objects of the invention are achieved through composition and process embodiments employing a polyurethane prepolymer component, a curing agent, a foaming agent, and a component for delaying the action of said foaming agent.

I.—Preparation of the polyurethane prepolymer component

The polyurethane prepolymers employed in the practice of the invention are the condensates resulting from the reaction of a polyhydroxylated alkane with an excess of an aromatic or aliphatic di- or poly-isocyanate at temperatures ranging from about 50–120° C. for ½ to 4 hours. The condensation reaction can be conducted in the presence of an inert solvent or the solvent can be dispensed with. The preferred polyhydroxylated alkanes have from 2–8 free hydroxyl groups and a molecular weight of between 200–1,000. An excess of diisocyanate is an amount over and above the quantity required by stoichiometry to react with each of the free hydroxyl groups of the polyhydroxylated reactant. Ordinarily, no catalyst is required for the condensation reaction because of the extreme reactivity of the reactants. In order to produce a prepolymer having long-term stability, it is necessary to have a slight excess of free acidity. Control of the free acidity can be achieved among other ways by the addition of a source of hydrogen chloride during the reaction. A convenient means of controlling the free acidity in the reaction mixture is through the incorporation of from 50–500 p.p.m. of a compound which slowly hydrolyses to hydrogen chloride in the reaction mixture. Satisfactory compounds include the aromatic and substituted aromatic acid halides and sulphonyl acid halides such as benzoyl and toluyl chlorides and benzene and toluene sulfonyl chloride, thionyl chloride and the like.

The polyhydroxylated alkane components are commercially available or can be prepared by reacting an alkylene oxide or alkylene carbonate containing 2–6 carbon atoms with a polyhydroxylated reactant.

Among the many polyhydroxylated reactants which can be satisfactorily used are the carbohydrates, glycols and polyglycols including the tri-, tetr-, pent-, hex-, hept- and octols and their derivatives. More specifically, suitable polyhydroxylated reactants include ethylene propylene and butylene glycols, hexanediol, hexanetriol, methylhexanediol, diethylene glycol, glycerol, trimethylol ethane, trimethylol propane, 1,2,4-trihydroxyl-butane, triethanolamine, 4-methyl-3 cyclohexene, 1,1-dimethanol, pentaery-thritol, arabitol mannitol, sorbitol, sucrose, methyl glucoside.

The polyhydroxylated alkanes are favored because of their low cost and their availability in large quantities in a high state of purity and because of the superior resins that are produced when they are used. These include adducts produced by reacting ethylene or propylene oxide with trimethylol propane, triethylol propane, trimethylol butane or triethylol butane, the methyl glucosides or the ethyl glucosides. Especially superior results have been obtained with these same reactants where the resultant adducts have a hydroxyl number between 400–700 and a free NCO content between about 20–35%.

While 20–35% free NCO content is the preferred range, the NCO content of the polyurethane prepolymer can vary from 5–45% free NCO. However, the lower range of free NCO content gives rise to a soil-stabilizing composition which cures too slowly for the purpose sought and the degree of cross-linking of the polymer is lower than desired. Furthermore, the hardness of the resultant soil-stabilizing composition is reduced below the desirable level. On the other hand, while the upper range of about 45% free NCO content cures more rapidly, the higher degree of cross-linking imparts too great a brittleness to the polymer. The preferred range of 20–35% gives the right combination of polymer properties required to support heavy loads, i.e., rapid curing and good resiliency.

The free NCO percent content can be adjusted by varying the proportion of the polyhydroxylated component or the isocyanate used while holding the other constant. Thus, a lower ratio of polyhydroxylated component to isocyanate gives a prepolymer having a higher free NCO content while increasing the proportion of polyhydroxylated components yields a lower free NCO content prepolymer.

As indicated earlier the isocyanate co-reactant of the polyurethane prepolymer component can be aromatic, aliphatic, heterocyclic or cyclic. Among the satisfactory diisocyanates that can be used are: hexyl and octyl diisocyanate, tetramethylene, tetraethylene, pentamethylene, octamethylene, and dodecamethylene diisocyanates, 3,3-diisocyanate dipropylether, cyclohexyl diisocyanates, the xylylene diisocyanates, diphenylmethane 4,4'-diisocyanate, B,B'-diphenylpropane 4,4'-diisocyanate unadecamethylene diisocyanates, metaphenyl diisocyanate, p-phenylene diisocyanate, 1-methyl phenylene-2,4-diamine naphthalene 1,4-diisocyanate, 2,6-toluene diisocyanate, 1,3,5-benzene triisocyanate, tetrahydrofurfuryl diisocyanate, toluene 2,4-diisocyanate, 1,6-hexamethylene diisocyanate, 4-chloro-1,3-phenylene diisocyanate, 4,4-biphenylene diisocyanate, 1,5-naphthalene diisocyanate, 1,4-cyclohexylene diisocyanate, 4,4'-methylene bis-(cyclohexyl isocyanate), and polyarylpolyisocyanate.

Because of the superior polyurethane formulations which are produced when they are used and their availability at low cost, the preferred diisocyanate reactants are the aryl isocyanates such as benzene, toluene, xylene, di- and polyisocyanates.

II.—*Curing agents*

The curing system useed in the soil-stabilizing compositions of this invention consists of compositions rich in reactive hydroxyl groups or active hydrogen sites. These compositions include among others, primary and secondary amines, carboxylic acids, alcohols, glycols and polyols or combinations of these. Superior curing compositions are those having a hydroxyl number between about 300 and 800 and an acid number between about 0 and 50. These hydroxyl-rich compositions can originate from a variety of sources both natural or synthetic. For example, the hydroxylated composition can be derived from natural products such as tall oil or fractions of materials obtained from the refining of crude oil or coal. These products are especially attractive because of their low cost.

Where the tall oils are used it has been found that any of the commercially available tall oils will suffice. These commercial tall oils generally possess the range of characteristics set forth below:

Acid number _____ 160–180
Saponification number _____ 160–185
Fatty acid content, pct. _____ 45–60

Similarly when the coal tar fractions are used as the source of the hydroxyl groups, they need not be specially formulated or produced. The ordinary coal tar fractions produced as refining by-products are satisfactory. The commercially derived oils which have been found to be useful are those whose physical characteristics are shown below:

Specific gravity _____ 1.00–1.35
Acid number _____ 2.10–2.90
Hydroxyl number _____ 45–60
Equivalent weight _____ 950–1050

The tall oils or the coal tar fractions can be used separately or can be combined with each other or with other suitable materials. These two sources of oil, particularly the coal tar oil, are especially attractive as a low cost source of the hydroxyl groups and other groups rich in reactive hydrogen.

Alternative and preferred sources of compositions rich in reactive hydroxyl groups are certain synthetic condensates resulting from reacting a polyfunctional diamine with an alkylene oxide to form an alkylene oxide adduct. Suitable alkylene oxides include among others: ethylene oxide, propylene oxides and butylene oxides. Because of availability and cost the favored alkylene oxides are ethylene and propylene oxides. Examples of satisfactory polyfunctional diamines include among others ethylene diamine, propylene diamine, butylene diamine, and amylene diamine, diethylene triamine, benzylamine tetraethylene pentamine and triethylene tetramine.

The favored alkylene diamine reactants of this invention are those alkylene diamines containing from 2–5 amine groups or 2–5 substituted amine groups. These reactants are commercially available in large quantities in a high state of purity at low cost.

The alkylene oxide adducts of the alkylene diamines are commercially available products or they can readily be synthesized. For example, the adducts can be prepared by reacting the alkylene oxide with the diamines in approximately stoichiometric quantities until the desired number of active hydrogens on the nitrogen are replaced. The reaction is conducted between −50° to 50° C., preferably between −15° to 35° C., with or without inert diluents or catalysts. In the case of the preferred ethylene oxide and ethylene diamine reactants the reaction is continued until substantially all four hydrogens on the two nitrogen atoms are replaced with alkanol groups. The final products of this reaction should be free from substantial quantities of metals, water or free amines.

The alkylene oxide adducts of the alkylene diamines are the preferred curing systems of this invention because of the exceedingly rapid cures that are effected when they are used with the polyurethane prepolymer components. Rapid curing of the soil-stabilizing compositions is particularly desirable for military and tactical construction.

The ratio of polyurethane prepolymer to curing systems is a variable dependent upon the free NCO percent in the prepolymer or the hydroxyl number of the curing system. For the preferred prepolymer having about 25% free NCO, the ratio of the polyurethane prepolymer can range from about 7.0–0.08 parts by weight to each part by weight of a curing system. This ratio can also be expressed in terms of equivalent. For example, the above ratio is approximately 3.0 to 0.33 equivalents of NCO to 1.0 equivalent of curing system. The use of other prepolymers or curing systems with higher or lower NCO content or hydroxyl number will change these values correspondingly.

III.—*Foaming agents*

Foaming agents useful in the practice of the invention include low-boiling compounds such as $CCl_3F$, $CCl_2FCClF_2$

$CClF_2CClF_2$ and $CBrF_2CBrF_2$, or mixture thereof. While the preferred foaming agents are the polyhalogenated alkanes disclosed above, any substance that will cause foaming of the aforedescribed prepolymer components and their curing systems can be employed. These include water, inert gases, and solids. The gaseous group of foaming agents includes azo, diazo or other nitrogen containing foaming agents. When a solid is used as the foaming agent, the decomposition temperature of the solid must be exceeded by the temperature of the soil-stabilizing composition during the mixing and application thereof.

In accordance with the invention, the foaming agent preferably is a substance (such as the aforementioned polyhalogenated alkanes) which can serve as a solvent in the soil-stabilizing compositions (i.e., a substance that can condition the viscosity of the soil-stabilizing compositions). However, soil-stabilizing compositions in accordance with the invention can contain a solvent in addition to the prepolymer component, curing agent, and foaming agent described hereinbefore (and in addition to the compound for delaying the action of said foaming agent which will be described hereinafter). The degree of penetration of a soil-stabilizing composition is particularly important where it is to be applied to a porous soil structure such as sand. The soil matrix absorbs the uncured soil-stabilizing composition to a depth ranging from a fraction of an inch to several inches. The solvent content is an important factor in determining soil penetration. A composition containing at least 40% by weight or more of inert solvent has been found to assure maximum soil penetration. Other factors controlling the depth of penetration are moisture content, the type of soil structure and the prevailing temperature and weather conditions. As this discussion indicates, the choice and amount of solvent is dictated by the degree of foam desired and the soil penetration sought. Additional factions are cost, solvating ability and more important the temperature of the soil matrix at the application site.

IV. *Foam depressants*

Soil-stabilizing compositions in accordance with the invention also contain a material which serves to delay the foaming of said compositions by the action of the aforedescribed foaming agents, thus permitting the compositions to percolate into soil or sand to which they are applied before foaming begins. Materials satisfactory for this purpose include methylene chloride, acetone, xylene and toluene.

In some instances it may be advantageous to add additional components, such as surface acting agents, cure accelerators, emulsifiers and the like, to the prepolymer component, curing agent, foaming agent, and foam depressant employed in the soil-stabilizing compositions of the invention. Among the many cure accelerators that can be used are heavy metal salts and metallo-organics as well as various cyclic, aliphatic and aromatic amines. Examples of such cure accelerators include stannous octoate and dibutyl-tin-dilaurate, as well as the analogous lead, bismuth and antimony salts.

In practice, the preferred soil-stabilizing compositions of this invention are prepared in the following ways.

The curing system component and the polyurethane prepolymer, each stored separately, are carried unmixed to the application site and combined in a suitable container. An especially convenient means of effecting the mixing, where a quantity of soil-stabilizer is to be applied, is by metering a measured amount of the components into a mixing hose such as is utilized in spraying the so-called gunite type concrete. In this type of application, the mixing of the two components is done through a mixing T using air for a mechanical mixer. Alternatively, the mixing can be done using an ordinary container using mechanical or manual mixing means. Where a large volume of the soil-stabilizing mixture is to be made up, a mechanically driven mixer is used and a mechanically powered pump is used to apply the mixture. Where the quantities are smaller, the mixing and application can be either by hand or mechanical means.

The mixed but uncured soil-stabilizing mixture is sprayed or otherwise applied to the soil structure to be treated, at the rate of 15 to 1,000 pounds or more of mixture per 100 sq. ft. The quantity of material applied depends upon the type of use anticipated. For example, where heavy duty use is intended, the amount of uncured resin will range from 90 to 500 pounds per 100 sq. ft. While amounts of resin above 500 lbs. per 100 sq. ft. can obviously be used and will yield a stronger surface, the increased cost seldom can be justified for temporary surfacing. Where the foamed resin surface will be subject to light-weight or intermittent use, a much lower range of application such as 15–300 lbs. per 100 sq. ft. will ordinarily be satisfactory.

In its composition aspect, this invention is advantageous over the prior art asphaltic, cement and bituminous type paving or coating materials in several respects. For example, the equipment needed for mixing and application of the uncured foam resin are inexpensive and portable. Furthermore, a minimal amount of skilled labor is needed to handle and apply the mixed resin, and the individual components of the mixture are stable for long periods of time, sometimes as long as 1 year or more.

As explained hereinbefore, because of the foaming of soil-stabilizing compositions of this invention after they have penetrated soil or sand, the amount of soil-stabilizing composition that will harden a given area of ground is less than that required when prior art soil-stabilizing compositions are employed. Furthermore, the use of a material for delaying the foaming of the disclosed soil-stabilizing compositions permits the polymer to percolate into soil or sand before foaming begins, thus providing a thick layer of solidified polymer and soil or sand which can withstand considerable wear from vehicle traffic.

While the polymeric foams of this invention are much slower curing than the known urethane foams of the prior art, they harden much more rapidly than do the conventional paving and construction surfacing materials. For example, the foams of this invention without the inclusion of curing accelerators, routinely harden to a load bearing surface within 3 hours of application. When a small quantity of curing accelerator is added to the composition, it sets to a useable surface within an hour or even less. In contrast, asphalt and concrete-type materials take many hours to harden under normal conditions and under low and high temperature extremes sometimes require even longer. Thus, compared to conventional paving and surfacing materials, the novel polymeric soil-stabilizers of this invention offer a considerable savings in time measured from the time of application to the time of use. For military and emergency operations this time savings is invaluable.

In its process aspects, this invention offers substantial advantages over conventional methods of stabilizing or surfacing soil known to the prior art. Among these advantages are: simpler and more portable mixing and application equipment, the use of less labor and more unskilled labor during formulation or application. Additional advantages are that the compositions are quick setting and can be exposed to heavy duty use shortly after application, and that no-sub-soil treatment is required. Finally, the polymeric surfacing can be applied regardless of the season of the year or existing weather conditions.

Other advantages of this invention will become apparent to those skilled in the art upon a more thorough perusal of this application. To more clearly set forth the operation of this invention in both its composition and process aspects, the following illustrative examples are submitted.

EXAMPLE I.—*Preparation of a representative foam formulation*

A.—Curing system

In this example, a commercially available propylene oxide adduct of ethylene diamine is used as the curing system component. The tetra substituted ethylene diamine has a molecular weight of 292 and is essentially N,N',N',N'-tetrakis (2-hydroxypropyl) ethylene-diamine whose preparation is described in the U.S. Patent 2,697,118.

A 2.225 parts by weight portions of the above N,N', N',N'-tetrakis (2-hydroxypropyl) ethylene diamine is thoroughly mixed with 6.275 parts by weight of methylene dichloride solvent in a suitable mixing vessel. The resultant solution is a transparent low viscosity liquid.

B.—Polyurethane prepolymer

The resin system used in this example is a polyurethane prepolymer prepared by reacting toluene diisocyanate with a commercially available liquid propylene oxide adduct of trimethylolpropane having a molecular weight of approximately 440, a hydroxyl number of about 404 and whose viscosity at 80° F. is approximately 6 poises. The preparation is as follows:

To a suitable mixing vessel equipped with heating, cooling and stirring means is added a 247 parts by weight portion of toluene diisocyanate followed by 100 parts by weight of the above described commercially derived propylene oxide adduct of trimethylolpropane. During the addition and reaction, the temperature is kept at 90–110° C. After 1 hour of heating, the preparation of prepolymer is complete. The prepolymer is cooled to room temperature for further use or storage. The prepolymer has the following characteristics:

NCO—25%
Viscosity (Brookfield)—40 poises at 80° F.

To complete the preparation of the polyurethane prepolymer component 24 parts by weight of methylene dichloride and 27 parts by weight of CCl₃F foaming agent are added to each 100 parts by weight of prepolymer used and the mixture is blended to a homogeneous composition.

C.—Mixing of curing system and prepolymer and application

A 151 parts by weight portion of the curing system as described above in Subsection A is combined with 151 parts by weight of the finished polyurethane prepolymer described in Subsection B and the solutions are mixed by hand for 30 seconds until a uniform mixture is obtained. The foam mixture, which weighs approximately 10 lbs./gal., is applied by hand upon a strip of sandy beach (20 ft. x 22 ft.) at the rate of 7 gallons per 100 sq. ft. Thirty minutes to two hours after application, the foam hardens the sand so that it can be used as a road for military vehicles.

EXAMPLE II.—*Preparation of a Representative Foam Formulation*

A.—Curing system

In this example, a commercially available propylene oxide adduct of propylene diamine is used. The tetra substituted propylene diamine adduct has a molecular weight of 306 and is esentially N, N, N′, N′-tetrakis (2-hydroxypropyl) propylene diamine. The preparation of this compound and homologous compounds is described in U.S. Patent 2,697,118.

A 41.4 parts by weight portion of the above N,N,N′,N′-tetrakis (2-hydroxypropyl) propylene diamine is thoroughly mixed with 111.7 parts by weight of methylene chloride solvent in a suitable mixing vessel. The resultant solution is a transparent low viscosity liquid.

B.—Polyurethane prepolymer

The resin system used in this example is a polyurethane prepolymer prepared by reacting toluene diisocyanate with a commercially available liquid propylene oxide adduct of trimethylol propane having a molecular weight of approximately 440, a hydroxyl number of about 404 and whose viscosity at 80° F. is approximately 6 poises. The preparation is as follows:

To a suitable mixing vessel equipped with heating, cooling and stirring means is added a 247 parts by weight portion of toluene diisocyanate followed by 100 parts by weight of the above described commercially derived propylene oxide adduct of trimethylol propane. During the addition and reaction of the ingredients, temperature is kept at 90–100° C. After 1 hour of heating, the preparation of prepolymer is complete. The prepolymer is cooled to room temperature for further use or storage. The prepolymer has the following characteristics:

NCO—25%
Viscosity (Brookfield)—40 poises at 80° F.

To complete the preparation of the polyurethane component, a 100 parts by weight portion of the described polyurethane prepolymer is mixed with 27 parts by weight of CCl₃F foaming agent and 26 parts by weight of toluene.

C.—Mixing of curing system and prepolymer and application

Equal weights of the curing system component and the polyurethane prepolymer which were described above in Subsections A and B are mixed by hand for 30 seconds until a uniform mixture is obtained. The foam mixture, which weighs approximately 10 lbs./gal., is applied by hand to a strip of sandy beach (20 ft. x 8 ft.) at the rate of 7 gallons per 100 sq. ft. Thirty minutes after application, the foam hardens the sand so that it can be used as a road for military vehicles.

EXAMPLE III.—*Preparation of other representative foam formulations*

A.—Curing system

In this example, a commercially available propylene oxide adduct of hexamethylene diamine is used as the "A" component. The tetra substituted hexamethylene diamine has a molecular weight of 346 and is essentially N,N′,N′,N′ - tetrakis (2 - hydroxypropyl) hexamethylene diamine whose preparation is described in U.S. Patent 2,697,118.

A 46.7 parts by weight portion of the above N,N′,N′,N′-tetrakis (2-hydroxypropyl) hexamethylene diamine is thoroughly mixed with 112 parts by weight of methylene chloride solvent in a suitable mixing vessel. The resultant solution is a transparent low viscosity liquid.

B.—Polyurethane prepolymer

The resin system used in this example is a polyurethane prepolymer prepared by reacting toluene diisocyanate with the commercially available liquid propylene oxide adduct of trimethylol propane described in Example I–B. The preparation is identical to that given in B in Examples I and II and the prepolymer has the same physical characteristics as these preparations.

To complete the preparation of the polyurethane component, a 45 parts by weight portion of CCl₃F foaming agent is added to 100 parts by weight portion of the above prepolymer and the resultant mixture is diluted with 13½ parts by weight of acetone.

C.—Mixing of curing system and prepolymer and application

Equal weights of components described above in Subsections A and B are mixed by hand for 30 seconds until a uniform mixture is obtained. The foam mixture is applied by hand upon a strip of sandy beach (20 ft. x 8 ft.) at the rate of 7 gallons (approximately 70 pounds) per 100 sq. ft. Thirty minutes after application the foam hardens the sand so that it can be used as a road for military vehicles.

EXAMPLE IV.—*Preparation of high solid content soil stabilizing formulation*

In this example, the same curing system, solvent, prepolymer and foaming agent used in Example I are used. The formulation is illustrative of the lower (20%) limit of solids which can be incorporated into the soil stabilizing compositions and yield a practical composition.

A.—Curing system

A 2225 parts by weight portion of the N,N',N',N'-tetrakis (2-hydroxypropyl) ethylene diamine described in Example I is thoroughly mixed with 10.5 parts by weight of methylene chloride solvent in a suitable mixing vessel to yield a transparent low viscosity liquid mixture.

B.—Polyurethane prepolymer

A 562.8 parts by weight portion of the polyurethane prepolymer prepared as described in Example I is mixed with 1248.0 parts by weight of methylene chloride and 152.2 parts by weight of $CCl_3F$ foaming agent and the mixture is blended to a homogeneous composition.

C.—Mixing of curing system and prepolymer and application

A 151 parts by weight portion of the curing system as described above is combined with 151 parts by weight of the finished polyurethane prepolymer and the solutions are mixed by hand for 30 seconds until a uniform mixture is obtained. The foam mixture, which weighs approximately 10 lbs./gal., is applied by hand to a strip of sandy beach (20 ft. x 22 ft.) at the rate of 7 gallons per 100 sq. ft. Thirty minutes after application, the foam hardens the sand so that it can be used as a road for military vehicles.

EXAMPLE V.—*Preparation of a high solid content soil stabilizing formulation*

In this example, the same curing system, solvent prepolymer and foaming agent used in Example I are used. The formulation is illustrative of the upper (80%) limit of solids which can be incorporated into the soil stabilizer and yield a practical composition.

A.—Curing system

A 890.0 parts by weight portion of the N,N,N',N'-tetrakis (2-hydroxypropyl) ethylene diamine described in Example I is thoroughly mixed with 177 parts by weight of methylene chloride solvent in a suitable mixing vessel to yield a transparent low viscosity liquid mixture.

B.—Polyurethane prepolymer

A 2251 parts by weight portion of the polyurethane prepolymer prepared as described in Example I is mixed with 608 parts by weight of $CCl_3F$ foaming agent and the mixture is blended to a homogeneous composition.

C.—Mixing of curing system and prepolymer and application

A 100 parts by weight portion of the curing system as described above is combined with 267.94 parts by weight of the finished polyurethane prepolymer and the solutions are mixed by hand for 30 seconds until a uniform mixture, is obtained. The foam mixture, which weighs approximately 10 lbs./gal. is applied by hand to a strip of sandy beach (20 ft. x 22 ft.) at the rate of 7 gallons per 100 sq. ft. Thirty minutes after application, the foam hardens the sand so that it can be used as a road for military vehicles.

EXAMPLE VI.—*Varying the ratio of curing system to prepolymer*

In this example, the same curing system, solvent, prepolymer and foaming agent used in Example I are used. The two formulations are illustrative of the upper and lower ratios of the curing system and prepolymer used in preparing the soil stabilizing compositions.

I.—*Preparing a composition with a curting system: Prepolymer ratio of 1 to 3*

A.—Curing system

A 917.8 parts by weight portion of the N,N,N',N'-tetrakis (2-hydroxypropyl) ethylene diamine described in Example I is thoroughly mixed with 837.3 parts by weight of methylene chloride solvent in a suitable mixing vessel to yield a transparent low viscosity liquid mixture.

B.—Polyurethane prepolymer

A 703.5 parts by weight portion of the polyurethane prepolymer prepared as described in Example I is mixed with 861.3 parts by weight of methylene chloride and 190.3 parts by weight of $CCl_3F$ foaming agent and the mixture is blended to a homogeneous composition.

C.—Mixing of the curing system and prepolymer and application

A 151 parts by weight portion of the curing system as described above is combined with 151 parts by weight of the finished polyurethane prepolymer and the solutions are mixed by hand for 30 seconds until a uniform mixture is obtained. The foam mixture which, weighs approximately 10 lbs./gal., is applied by hand to a strip of sandy beach (20 ft. x 22 ft.) at the rate of 7 gallons per 100 sq. ft. Thirty minutes after application, the foam hardens the sand so that it can be used as a road for military vehicles.

II.—*Preparing a composition with a curing system: Prepolymer ratio of 3 to 1*

A.—Curing system

A 102 parts by weight portion of the N,N,N',N'-tetrakis (2-hydroxypropyl) ethylene diamine described in Example I is thoroughly mixed with 769.8 parts by weight of methylene chloride solvent in a suitable mixing vessel to yield a transparent low viscosity liquid mixture.

B.—Polyurethane prepolymer

A 703.5 parts by weight portion of the polyurethane prepolymer prepared as described in Example I is mixed with 168.3 parts by weight of $CCl_3F$ foaming agent and the mixture is blended to a homogeneous composition.

C.—Mixing of curing system and prepolymer and application

A 151 parts by weight portion of the curing system as described above is combined with 151 parts by weight of the finished polyurethane prepolymer and the solutions are mixed by hand for 30 seconds until a uniform mixture is obtained. The foam mixture, which weighs approximately 10 lbs./gal., is applied by hand to a strip of sandy beach (20 ft. x 22 ft.) at the rate of 7 gallons per 100 sq. ft. Thirty minutes after application, the foam hardens the sand so that it can be used as a road for military vehicles.

EXAMPLE VII.—*Preparation of foam formulations*

A.—Curing system

In this example an ethylene oxide adduct of ethylene diamine is used. The tetra substituted ethylene diamine has a molecular weight of 236 and is essentially N,N,N',N'-tetrakis (2-hydroxyethyl) ethylene diamine.

A 222.5 parts by weight portion of N,N,N'N'-tetrakis (2-hydroxyethyl) ethylene diamine is combined with and thoroughly mixed with 627.5 parts by weight of acetone in a suitable mixing vessel. The resultant solution is a transparent low viscosity liquid.

B.—Polyurethane prepolymer

The resin system used in this example is a polyurethane prepolymer prepared by reacting naphthalene 1,4-diisocyanate with a commercially available liquid propylene oxide adduct of trimethylol propane having a molecular weight of 440, a hydroxyl number of about 404 and whose viscosity at 80° is approximately 6 poises. The preparation is as follows:

To a suitable mixing vessel equipped with a heating, cooling and stirring means is added 297.7 parts by weight of naphthalene 1,4-diisocyanate followed by 100 parts by weight portion of the above described propylene oxide adduct of trimethylol propane. During the reaction the temperature is kept at 90–110° C. After 2 hours of heating the preparation of prepolymer is complete. The prepolymer is cooled and diluted with 24 parts by weight of acetone and 27 parts by weight of CCl₃F foaming agent for each 100 parts by weight of prepolymer used.

C.—Mixing of curing system and prepolymer and application

Equal weights of the curing system and resin components described above are mixed and applied by hand to a strip of sand 20 ft. x 8 ft. The foam, which weighs approximately 11 lbs./gal., is applied at the rate of 7 gallons per 100 sq. ft. The hardened sand thus produced can be used as a road for military vehicles.

EXAMPLE VIII.—*Preparation of other foam formulations*

A.—Curing systems

In this example the N,N,N',N'-tetrakis (2-hydroxypropyl) ethylene diamine methylene chloride curing system described in Example I is used.

B.—Resin system

The resin system used in this example is polyurethane prepolymer prepared by reacting toluene diisocyanate with a commercially available liquid propylene oxide adduct of sorbitol having a molecular weight of approximately 650, a hydroxyl number of about 549, and whose viscosity at 25° C. is approximately 180 poises. The preparation is as follows:

To a suitable mixing vessel equipped with heating, cooling and stirring means is added a 283 parts by weight portion of toluene diisocyanate followed by 100 parts by weight of the above described commercially derived propylene oxide adduct of sorbitol. During the addition of the adduct to the diisocyanate, the reaction temperature is kept at 100° C. After 2 hours of heating at this temperature, the preparation is complete. To complete the preparation of the resin component 21 parts by weight of methylene dichloride and 30 parts by weight of CCl₃F foaming agent are added to each 100 parts of prepolymer used.

C.—Mixing of curing system and prepolymer and application

Equal weights of the curing system and resin components described above are hand mixed for 45 seconds until a uniform mixture is obtained. The foam mixture is applied as described in the preceding examples to a 20 ft. x 8 ft. section of sandy beach. The hardened sand thus produced can be used as a road for military vehicles.

EXAMPLE IX.—*Preparation of other representative formulations*

A.—Curing system

In this example a commercial tall oil is used as the curing system. The cut used had the following physical characteristics: density 0.97, $n^{20}$ 1.50; acid number 174, saponification number 176, fatty acids 54.3%, hydroxyl number 58.2.

A 443 parts by weight portion of the above described tall oil is thoroughly mixed with 402 parts by weight of acetone in a suitable mixing vessel. The resultant solution is a transparent low viscosity liquid.

B.—Polyurethane prepolymer

The resin system used in this example is a polyurethane prepolymer prepared by reacting naphthalene 1,4-diisocyanate with a commercially available liquid propylene oxide adduct of trimethylol propane having a molecular weight of 440, a hydroxyl number of about 404 and whose viscosity at 80° F. is approximately 6 poises. The preparation is as follows:

To a suitable mixing vessel equipped with a heating, cooling and stirring means is added 238 parts by weight of naphthalene 1,4-diisocyanate followed by 100 parts by weight of the above described propylene oxide adduct of trimethylol propane. During the reaction, the temperature is kept at 90–110° C. After two hours of heating the preparation of prepolymer is complete. The prepolymer is cooled and diluted with 81 parts by weight of CCl₃F foaming agent, and 426 parts by weight of acetone.

C.—Mixing of curing system and prepolymer and application

Equal weights of the curing system resin components described above are mixed and applied by hand upon a strip of sand 20 ft. x 8 ft. The foam is applied at the rate of 7 gallons per 100 sq. ft. The hardened sand thus produced can be used as a road for military vehicles.

EXAMPLE X.—*Preparation of further foam formulations*

In this example the curing system of Example I is used and the resin component is a polyurethane prepolymer prepared by reacting toluene diisocyanate with an ethylene oxide adduct of sorbitol. The preparation of the polyurethane prepolymer component is as follows:

To a suitable mixing vessel equipped with heating, cooling and stirring means is added a 285 parts by weight portion of toluene diisocyanate followed by 100 parts by weight of the above described ethylene oxide adduct of sorbitol. During the addition and reaction, the temperature is kept at 100° C. After 2 hours of heating the preparation is complete. Thirty-five parts by weight of CCl₃F foaming agent and 16 parts by weight of methylene chloride are added to each 100 parts of prepolymer used.

The resin component and curing system components are hand mixed in 1:1 proportion and applied to a 20' x 8' test strip of sand, which is within a short time hardened so that it can be used as a road for military vehicles.

EXAMPLE XI.—*Preparation of other representative foam formulations*

A.—Curing system

In this example a 131 parts by weight portion of the tall oil fraction of Example IX is diluted with 118.5 parts by weight of acetone used as the curing system.

B.—Polyurethane prepolymer

The resin system used in this example is a polyurethane prepolymer prepared by reacting toluene diisocyanate with a commercially available liquid propylene oxide adduct or sorbitol having a molecular weight of approximately 650, a hydroxyl number of 549, and whose viscosity at 25° F. is approximately 180 poises. The preparation is as follows:

To a suitable mixing vessel equipped with heating, cooling and stirring means is added a 283 parts by weight portion of toluene diisocyanate followed by 100 parts by weight of the above described commercially derived propylene oxide adduct of sorbitol. During the addition and reaction, the temperature is kept at 100° C. After 2 hours of heating the preparation is complete. To complete the preparation of the resin component 30 parts by weight of CCl₃F foaming agent and 118.5 parts by weight of acetone are added to each 100 parts of prepolymer used.

C.—Mixing of curing system and prepolymer and application

Equal weights of the curing system and resin components described above are hand mixed for 45 seconds until a uniform mixture is obtained. The foam mixture is applied as described in the preceding examples to a 20 ft. x 8 ft. section of sandy beach and hardens the sand so that it can be used as a road for military vehicles.

EXAMPLE XII.—*Preparation of another representative foam formulation*

A.—Curing system

In this example a commercially available coal tar oil is used as the curing system. The particular fraction had the following characteristics: density, 1.19; specific viscosity, engler 50° C.–17.84; naphthalene content, 9.6% by weight; tar acids, 1.53% by weight; tar basicity, 0.80% by weight. Distillation percent by weight: to 170° C., 7.3%; to 270° C., 15.6%; to 300° C., 21.5%; to 355° C., 35.8%; hydroxyl number, 53.6; acid number, 2.38.

A 541 parts by weight portion of the above coal tar is thoroughly mixed with 151.5 parts by weight of methylene chloride solvent in a suitable mixing vessel. The resultant solution is a relatively low viscosity liquid.

B.—Polyurethane prepolymer

The resin system used in this example is a polyurethane prepolymer prepared by reacting toluene diisocyanate with a commercially available liquid propylene oxide adduct of trimethylol propane whose preparation is described in Example I. The adduct has the following properties: a molecular weight of 440, a hydroxyl number of about 404 and whose viscosity at 80° is approximately 6 poises. The preparation is identical to that described in Example B.

To compelte the preparation of the B component 565.5 parts by weight of methylene chloride and 27 parts by weight of $CCl_3F$ foaming agent are added to each 100 parts by weight of prepolymer used.

C.—Mixing of curing system and prepolymer and application

Equal weights of the curing system and resin components described above are mixed by hand for 5 minutes until a uniform mixture is obtained. The foam mixture, which weighs approximately 10 lbs./gal., is sprayed by hand upon a strip of sandy beach (20 ft. x 8 ft.) at the rate of 7 gallons per 100 sq. ft. A few hours after application the sand is hardened so that it can be used as a road for military vehicles.

EXAMPLE XIII.—*Preparation of a foam formulation using a coal tar oil-tall oil curing system*

A.—Curing system

In this example the curing system (A component) is prepared by combining 270.5 parts by weight of the coal tar oil described in Example XII with 221.5 parts by weight of the tall oil described in Example IX and 148.0 parts by weight of acetone. The thoroughly stirred curing system mixture need only be combined with the Polyurethane Prepolymer described below.

B.—Polyurethane prepolymer

One hundred parts by weight of the polyurethane prepolymer whose preparation is described in Examples I and II is used as the base material. The preparation of the prepolymer and adding 27 parts by weight of $CCl_3F$ foaming agent and 513 parts by weight of acetone to the stirred mixture.

C.—Mixing of curing system and prepolymer and application

To prepare the soil-stabilizing composition, the entire batch of the above-described curing system is combined with the above-described polyurethane prepolymer with vigorous stirring. The resultant foam mixture is mechanically sprayed upon a strip of sandy beach 200 sq. ft. in area. Upon curing of the soil-stabilizing composition, the sand is hardened so that it can be used as a road for military vehicles.

EXAMPLE XIV.—*Preparation of further formulations*

In this example the tall oil of Example IX is cut on a 1:1 volume basis with the N,N′,N′,N′-tetrakis (2-hydroxypropyl) ethylene diamine curing system described in Example I. The mixture of 30.25 parts by weight tall oil and 30.25 parts by weight of N,N′,N′,N′-tetrakis (2-hydroxypropyl) ethylene diamine is diluted with 113.3 parts by weight of methylene chloride used as a curing system for the polyurethane prepolymer described in this example.

To a suitable mixing vessel equipped with heating, cooling and stirring means is added a 285 parts by weight portion of toluene diisocyanate followed by 100 parts by weight of the ethylene oxide adduct of sorbitol described in Example X. During the addition and reaction, the temperature is kept at 100° C. After 2 hours of heating the preparation is complete. Thirty-five parts by weight of $CCl_3F$ foaming agent and 38.8 parts by weight of methylene chloride are added to each 100 parts of prepolymer used.

The resin component and tall oil-N,N′,N′,N′-tetrakis (2-hydroxypropyl) ethylene diamine curing system components are hand mixed on an equal volume basis and applied to a 20 ft. x 8 ft. test strip of sand, which within a few hours hardens so that it can be used as a road for military vehicles.

EXAMPLE XV.—*Preparation of other foam formulations*

A.—Curing system

The N,N′,N′,N′-tetrakis (2-hydroxypropyl) ethylene diamine of Example I is used as the curing system of this example. A 2.225 parts by weight portion of this compound is thoroughly mixed with 6.275 parts by weight of benzene in a suitable mixing vessel to complete the preparation of the "A" component.

B.—Polyurethane prepolymer

The polyurethane used in this example is a polyurethane prepared by reacting 2,4-toluene diisocyanate with a liquid propylene oxide adduct of methyl glucoside. The resultant adduct has a molecular weight of approximately 500 and a hydroxyl number of approximately 450. The preparation is as follows:

To a reactor equipped as previously described is added a 253 parts by weight portion of 2,4-toluene diisocyanate followed by 100 parts by weight of the above described propylene oxide adduct of methyl glucoside. During the addition the temperature is kept at about reflux temperature. After several hours the preparation of prepolymer is complete. After the prepolymer has cooled, 24 parts by weight of benzene and 27 parts by weight of $CCl_3F$ foaming agent per 100 parts by weight of prepolymer are added.

C.—Mixing of curing system and prepolymer and application

Sixty parts by weight of component A and 50.5 parts by weight of component B are hand mixed for 45 seconds until a uniform blend is obtained. The foam blend is sprayed upon a 20 ft. x 8 ft. test strip of sandy beach at the rate of application of 9 gallons per 100 sq. ft. of beach. The hardened sand thus produced can be used as a road for military vehicles.

EXAMPLE XVI to XXIII.—*Preparation of representative foam compositions using the curing system of Example I and different isocyanates*

In these examples the curing system is the 2.225 parts by weight of N,N′,N′,N′-tetrakis (2-hydroxypropyl) ethylene diamine used in Example I Part (A) diluted with 6.275 parts by weight of methylene chloride. The prepolymers are prepared by reacting the propylene oxide adduct of trimethylol propane whose properties are described in Example I, Part (B). In each instance the prepolymer is prepared by reacting 2 equivalents of the listed diisocyanate or polyisocyanate with 1 equivalent of the adduct at reflux temperatures for 2–9 hours. The A–B mixture is prepared by hand mixing 2 parts by weight of the (A) curing system and 1.5 parts of the (B) prepolymer, with 40 parts by weight of $CCl_3F$ foaming agent being added to assure the formation of a superior foam. The soil-stabilizing compositions thus obtained can be used to harden sand so that it can be used as a road for military vehicles.

Example No.
- XVI.—20% by weight, 2,6-toluene diisocyanate and 2,4-toluene diisocyanate (80% by weight)
- XVII.—Diphenylmethane, 4,4'-diisocyanate
- XVIII.—1,3,5-benzene triisocynate
- XIX.—1,6-hexamethylene diisocyanate
- XX.—1,5-naphthalene diisocyanate
- XXI.—1,4-cyclohexylene diisocyanate
- XXII.—Tetrahydrofurfuryl diisocyanate
- XXIII.—2,4-toluene diisocyanate (100% by weight)

EXAMPLES XXIV to XXVII.—*Varying the solvent in a foam formulation*

In these examples the curing system and polyurethane prepolymer and formulating procedure of Example I are used. However, in each instance the following foam depressant or foam depressant mixtures in the quantities indicated are used instead of methylene chloride.

| Example No. | Solvents | Total Weight of Solvent (Parts by Weight) |
|---|---|---|
| XXIV | Benzene | 6.275 |
| XXV | Toluene | 6.275 |
| XXVI | Xylene | 6.275 |
| XXVII | Equal parts by weight of acetone-toluene. | 6.275 |

In any of the above-described soil-stabilizing compositions, the $CCl_3F$ foaming agent employed therein can be replaced by other suitable foaming agents, such as $CCl_2FCClF_2$, $CClF_2CClF_2$, $CBrF_2CBrF_2$, or the aforementioned azo and diazo compounds commonly employed as foaming agents. The soil-stabilizing compositions thus obtained can be used to harden sand so that it can be used as a road for military vehicles.

What is claimed is:

1. A process for stabilizing soil or sand for support thereon of heavy loads by filling the subsurface interstices thereof with a foaming resin comprising the steps of: preparing a liquid foamable resin solution of (A) a polyhydroxylated alkane curing system; (B) a polyurethane prepolymer having an NCO content of about 20 to 35% by weight and formed from the condensation of a polyisocyanate with a polyhydroxylated alkane having from 2 to 8 free hydroxyl groups; (C) a foaming agent; and (D) a foam depressant; contacting said soil or sand with said solution; allowing said solution to percolate through the surface of said soil or sand to the subsurface interstices thereof; filling said interstices by the foaming of said solution which thereafter cures and forms with said soil or sand a hard surface suitable for supporting compressive loads such as heavy vehicles and the like.

2. The process of claim 1 wherein the soil or sand is contacted with said solution by spraying said solution over the surface thereof.

3. The process of claim 1 wherein said soil or sand is contacted by directly admixing said soil or sand and said solution.

4. A process according to claim 1, wherein said foaming agent is selected from the group consisting of $CCl_3F$, $CCl_2FCClF_2$, $CClF_2CClF_2$, $CBrF_2CBrF_2$, and mixtures thereof, and said foam depressant is selected from the group consisting of $CH_2Cl_2$, $CH_3COCH_3$, $C_6H_5CH_3$, $C_6H_4(CH_3)_2$, and mixtures thereof.

5. A process according to claim 1, wherein said composition comprises from about 2 to 46 parts by weight of said polyhydroxylated alkane curing system, from about 9 to 70 parts by weight of said polyurethane prepolymer, from 20 to 80 parts by weight of said foaming agent, and from 20 to 80 parts by weight of said foam depressant.

References Cited

UNITED STATES PATENTS

| | | | |
|---|---|---|---|
| 2,867,278 | 1/1959 | Mallory et al. | 166—33 |
| 2,889,883 | 6/1959 | Santora et al. | 61—36 |
| 3,126,959 | 3/1964 | Ortloff et al. | 166—33 |
| 3,137,346 | 6/1964 | McLennan | 166—33 |
| 3,181,611 | 5/1965 | Dollarhide | 166—33 |
| 3,181,612 | 5/1965 | West et al. | 166—33 |

DONALD E. CZAJA, *Primary Examiner.*

G. W. RAUCHFUSS, H. S. COCKERAM,
*Assistant Examiners.*